United States Patent
Smith

(10) Patent No.: US 7,278,061 B2
(45) Date of Patent: Oct. 2, 2007

(54) BUILDING PACKETS OF DATA FOR TESTING A COMMUNICATION NETWORK

(75) Inventor: Geoff Smith, Burwood (AU)

(73) Assignee: Agilent Technologies, Inc., Palo Alto, CA (US)

( * ) Notice: Subject to any disclaimer, the term of this patent is extended or adjusted under 35 U.S.C. 154(b) by 553 days.

(21) Appl. No.: 10/266,507

(22) Filed: Oct. 8, 2002

(65) Prior Publication Data
US 2004/0068681 A1 Apr. 8, 2004

(51) Int. Cl.
*G06F 11/00* (2006.01)

(52) U.S. Cl. .................... 714/43; 714/712; 370/242

(58) Field of Classification Search .............. 714/4, 714/25, 43, 721, 712; 370/241, 242, 229; 375/249, 224
See application file for complete search history.

(56) References Cited

U.S. PATENT DOCUMENTS

| | | | | |
|---|---|---|---|---|
| 4,745,593 A | * | 5/1988 | Stewart | 370/244 |
| 5,680,585 A | * | 10/1997 | Bruell | 703/26 |
| 5,818,603 A | * | 10/1998 | Motoyama | 358/296 |
| 5,822,520 A | * | 10/1998 | Parker | 709/230 |
| 6,167,537 A | * | 12/2000 | Silva et al. | 714/46 |
| 6,373,822 B1 | * | 4/2002 | Raj et al. | 370/252 |
| 6,564,265 B2 | * | 5/2003 | Tillmann et al. | 709/246 |
| 6,710,893 B1 | * | 3/2004 | Hou et al. | 358/1.15 |
| 6,862,699 B2 | * | 3/2005 | Nakashima et al. | 714/701 |
| 2002/0136210 A1 | * | 9/2002 | Boden et al. | 370/389 |
| 2003/0142629 A1 | * | 7/2003 | Krishnamurthi et al. | 370/249 |
| 2003/0156548 A1 | * | 8/2003 | Sapp | 370/252 |

OTHER PUBLICATIONS

TIA/EIA Interim Standard: cdma2000 High Rate Packet Data Air Interface Specification, Nov. 2000, Telecommunications Industry Association 2000, p. 6-77.*

* cited by examiner

*Primary Examiner*—Scott Baderman
*Assistant Examiner*—Paul Contino
(74) *Attorney, Agent, or Firm*—Marc Bobys

(57) ABSTRACT

A system for building a packet of test data for testing a communications network comprises a characterizing component which describes one or more protocols by providing one or more rules which are used to build the packet of test data. The system also includes a packet building component for building the packet of test data in accordance with the one or more protocol descriptions, and a storage component for storing one or more packets which are built by the packet building component.

28 Claims, 3 Drawing Sheets

US 7,278,061 B2

BUILDING PACKETS OF DATA FOR TESTING A COMMUNICATION NETWORK

FIELD OF THE INVENTION

This invention relates to building packets of data according to the rules and interpretations of communications protocols, and particularly, to building packets for use in testing a communications device or network.

BACKGROUND TO THE INVENTION

As network devices are developed, they are tested before they are released for public use. This ensures performance of the network devices prior to deployment so that erroneous transmissions and fatal errors are minimized. Parameters that are monitored when network devices are tested include routing verification, achievement of Quality of Service (QoS) levels under load, and correct interworking with other devices. The implementation of protocols used to transmit data or control information over communications networks are also tested to ensure correct operation.

Networks and network devices are tested by simulating network traffic using specifically created "test packets" of data that are typical of the live data present on the network. These test packets are then transmitted to the device or network under test. For the sake of convenience, the word "network" will hereinafter in the description and claims be used to refer to any one or more of: a communication network, a network device, any other communication device, and any aspect or aspects of a communication system which can be tested using test packets of data.

Test packets are built according to the rules and interpretations of communications protocols, such as those defined by the many standards bodies in the industry. There are many communications protocols in use and new protocols continue to be developed. Typically, new protocols are initially developed by equipment manufacturers and are proprietary in nature. Often, the protocols are subsequently adopted by standards bodies for widespread implementation in industry.

It is beneficial for a test device used to test networks to be able to construct test packets that accommodate a wide range of existing protocols. Furthermore, users of such test devices often demand that the test device have the flexibility to construct test packets for future-developed protocols not available at the time of the development of the test device.

However, this demand causes manufacturers of the test devices to continually add support for new protocols to the test devices, by coding rules and interpretations of the new protocols into the software used to construct test packets. This work usually requires specialist programming and networking knowledge and skills, and may take a period of months to complete. Such work can consume significant development resources of the test device manufacturer, making it difficult for the manufacturer of the test devices to meet the demands of the user in a timely fashion.

SUMMARY OF THE INVENTION

A system constructed according to a first embodiment of the present invention builds packets of test data for testing a communications network. The system includes a characterizing component that uses at least one protocol description to describe one or more protocols. A packet building component builds the packet of test data according to the protocol description. A storage component within the system stores the packet of test data built by the packet building component. The protocol description describes one or more rules or interpretations that are used to build the packet of test data.

According to a second embodiment of the present invention, a method builds a packet of test data for testing a network device. The method includes accessing a protocol description, supplying one or more parameters for use in building the packet of test data, and building the packet of test data according to the protocol description and the supplied parameters. The protocol description describes one or more rules for building the packet of test data.

According to a third embodiment of the present invention, a computer program product resides on a programmable medium conveying a programmed method for building a packet of test data for testing a network device. The programmed method includes accessing a protocol description, supplying parameters for building the packet of test data in accordance with the protocol description, and building the packet of test data using the supplied parameters according to the protocol description. The protocol description describes one or more rules for building the packet of test data.

DETAILED DESCRIPTION

Figure 1:
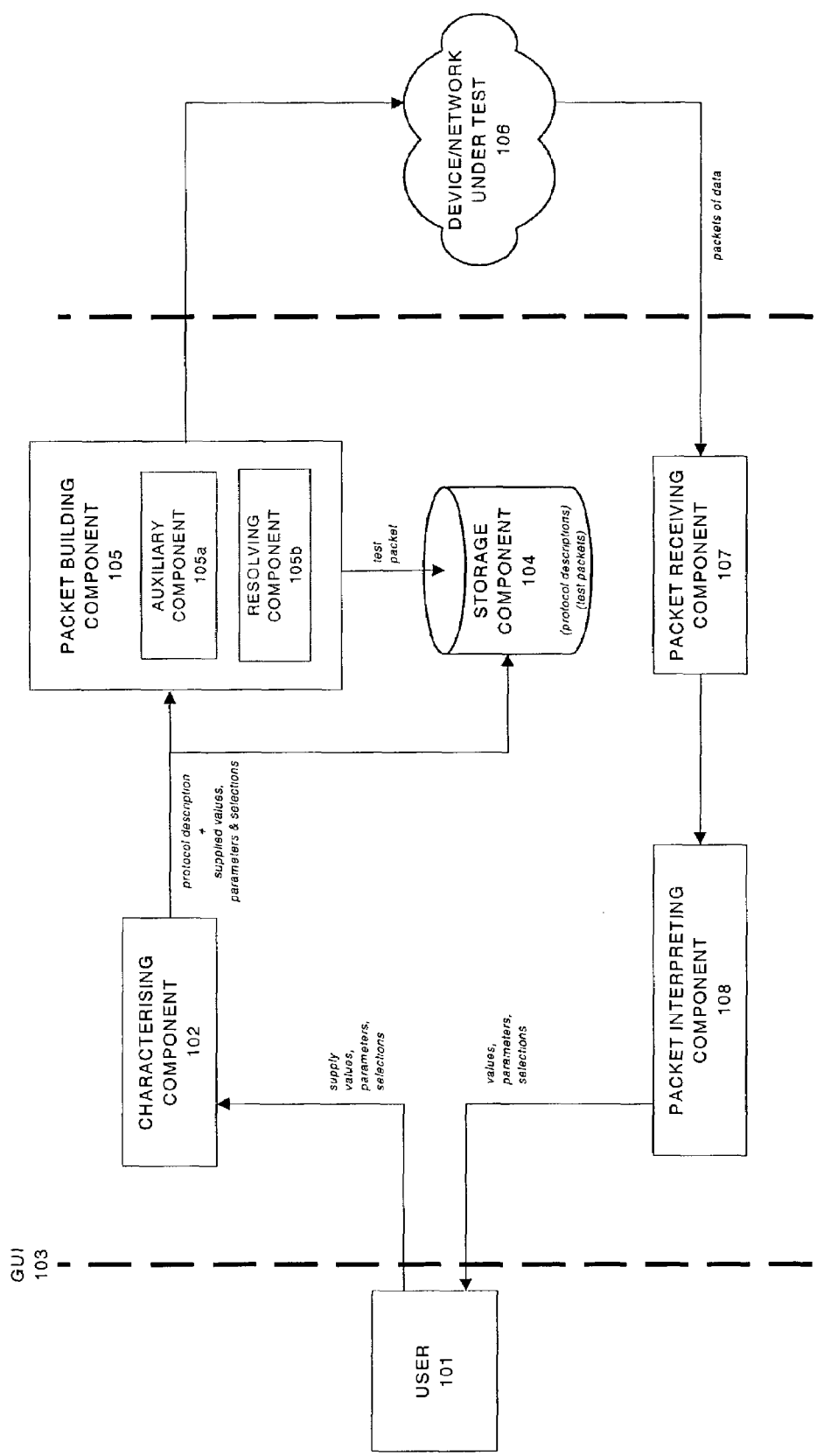
FIG. 1 is a flow diagram of an embodiment of the invention.

Referring to the flow diagram of FIG. 1, a system constructed according to a first embodiment of the invention builds packets of test data for testing a communications network. The system includes a characterizing component 102 that uses at least one protocol description to describe one or more protocols. A packet building component 105 builds the packet of test data according to the protocol description. A storage component 104 within the system stores the packet of test data build by packet building component 105. The protocol description describes one or more rules or interpretations which are used to build the packet of test data. Characterizing component 102 may be any suitable kind of component that facilitates entry of one or more rules for inclusion in the protocol description. The protocol description describes the protocol with which the packet of test data will be transmitted. Preferably, characterizing component 102 enables a user 101 of the system to provide sufficient attribute information to build a packet of data in accordance with an Internet protocol, or any protocol. Characterizing component 102 may also describe interpretations that are used by a particular protocol. Moreover, characterizing component 102 enables individual characteristics to be manually entered and enables user 101 to create or modify one or more protocol attributes through a programming or graphical user interface 103. Such modification may occur by user 101 supplying one or more additional parameters. The supplied parameters may be any parameters useful for building packets of test data, such as field selections, values and/or lengths which are particular to the specific packet of test data that the user wishes to build.

In one example, characterizing component 102 enables protocol descriptions to be stored on storage component 104 in one or more files. This, in turn, enables characterizing component 102 to be used to create a new protocol description by modifying a stored protocol description. A protocol description may be stored in any appropriate form and on any appropriate medium.

Storage component 104 may also store one or more test packets that have been built in accordance with the protocol description and using the supplied parameters. These test packets may be stored in raw binary format, or in an XML form related to, but not identical to, the protocol description or edited protocol description from which they were derived. The files containing protocol descriptions typically use extensible mark-up language (XML). However, any appropriate language and file type may be used, including simple text files. An example of a protocol description for the user datagram protocol (UDP), which has been written in XML, is provided in an APPENDIX.

A protocol description may begin with a protocol tag with general attributes pertaining to the protocol, followed by a number of field tags, each describing fields that may exist in an instance (or a packet of test data) created according to the protocol description. A payload tag may also be used to denote a part of the packet of test data reserved for "user data" that is not defined by the protocol itself. Accordingly, a specific "protocol description language" is not required for defining the attributes of a new protocol under test.

Once the attributes of the protocol have been described using characterizing component 102, packet building component 105 builds the packet of test data according to the protocol description. In one example, packet building component 105 is implemented in software using C++. Alternatively, packet building component 105 is implemented in hardware, software, or combinations of hardware and software.

To illustrate by way of example, user 101 creates a test packet for transmission using the Transmission Control Protocol (TCP). Characterizing component 102 contains a generic protocol description describing rules, interpretations and attributes of TCP packets. Typically, the generic protocol description is retrieved from storage component 104, which contains one or more descriptions of protocols. This generic protocol description is provided to packet building component 105 so that packet building component 105 is able to build any TCP packet. User 101 then supplies the required TCP data values to packet building component 105 to build the test packet. The test packet is then stored using storage component 104. Storage component 104 may also contain one or more packets of test data, which have been built in accordance with the generic TCP protocol description or a description of another protocol. Alternatively, the packet may be used directly by the test equipment for transmission to the device or network under test 106.

Graphical User Interface (GUI) 103 and/or an application programming interface (API) is alternatively included in the system to enable the attributes of the protocol of the packet of test data to be defined in a user-friendly environment. GUI 103 presents to user 101 a generic description of the packet being built so that user 101 can make field selections and supply field values and lengths for the test packet in a manner consistent with the protocol description. Typically, when values of a test packet being built are changed, checksums and other automated values are automatically recalculated. Further, GUI 103 enables the packet of test data to be created in such a way that any XML and C++ code is transparent to the user. The way in which the generic protocol description is stored (i.e. using .xml, .txt or another file type) will also be transparent to user 101. Alternatively, GUI 103 may be configured to present a standard set of protocol attributes which are coded into the GUI program itself although this limits the flexibility of the method.

GUI 103 typically employs a series of windows with drop-down menus and/or check boxes, or other suitable schemes, to enable user 101 to describe the protocol attributes for a new protocol being tested quickly and easily. Similarly, GUI 103 may be featured as part of packet building component 105, wherein user 101 can define protocols and build packets of test data in a quick and easy manner.

The system optionally includes packet receiving component 107 for receiving one or more packets of data from communications network 106, and packet interpreting component 108 for decoding the one or more received packets of data. Here, packet interpreting component 107 describes the characteristics of the received packets. The system that includes packet receiving component 107 and packet interpreting component 108 has capability to describe new protocols and build packets of test data for testing a network device using the new protocols, and also has the capability to analyze data received from network/device under test 106. Packet receiving component 107 and packet interpreting component 108 can also provide analytical data relating to the contents of the packets received from the network/device under test 106, such as fields and values that have been defined in the received packets, and the protocol type for which one or more received packets were generated.

The system is also able to build nested packets of test data, wherein the test data includes a nested packet of data instead of or in addition to a message. That is, the system is able to nest any protocol packet inside the payload portion of another protocol packet. Any number of protocols may be nested within any other to an arbitrary depth, and in any order. Further, the parent and/or nested protocol packets are editable. For example, a complete test packet may comprise several protocols including Ethernet, IP, TCP and BGP4, each protocol packet being nested within the payload of the other. The system is then able to build the complete test packet using protocol descriptions for each of the individual protocols that are described by characterizing component 102.

The system optionally includes auxiliary component 105*a* for creating checksums, executing algorithms to determine a value for a field in the packet of test data according. The algorithms may use the value of one or more fields elsewhere in the packet, or the length of one or more fields elsewhere in the packet, to generate value ranges for a plurality of subsequent packets of test data.

As an additional feature, the system may also include resolving component 105*b* to ensure that fields defined in the protocol description are consistent with each other and are consistent with the protocol attributes that have been described.

A protocol description that has been stored may be accessed and edited by user 101, enabling the attributes, rules and/or interpretations to be changed to describe the protocol with which the packet of test data will be sent. This edited protocol description may then be stored, in a .xml or other appropriate type of file and then re-used at a later time for building subsequent packets of test data.

The method of building a packet of test data optionally includes receiving a packet of data from communications network, and interpreting the received packet to describe the contents of the packet. Here, information relating to fields and values in the received packets may be obtained. This information can be used to analyze data that is received in the form of packets from network/device under test 106.

The programmed method also optionally includes receiving a packet of data from the computer network, and interpreting the received packet of data to describe the contents of the packet.

Figure 2:
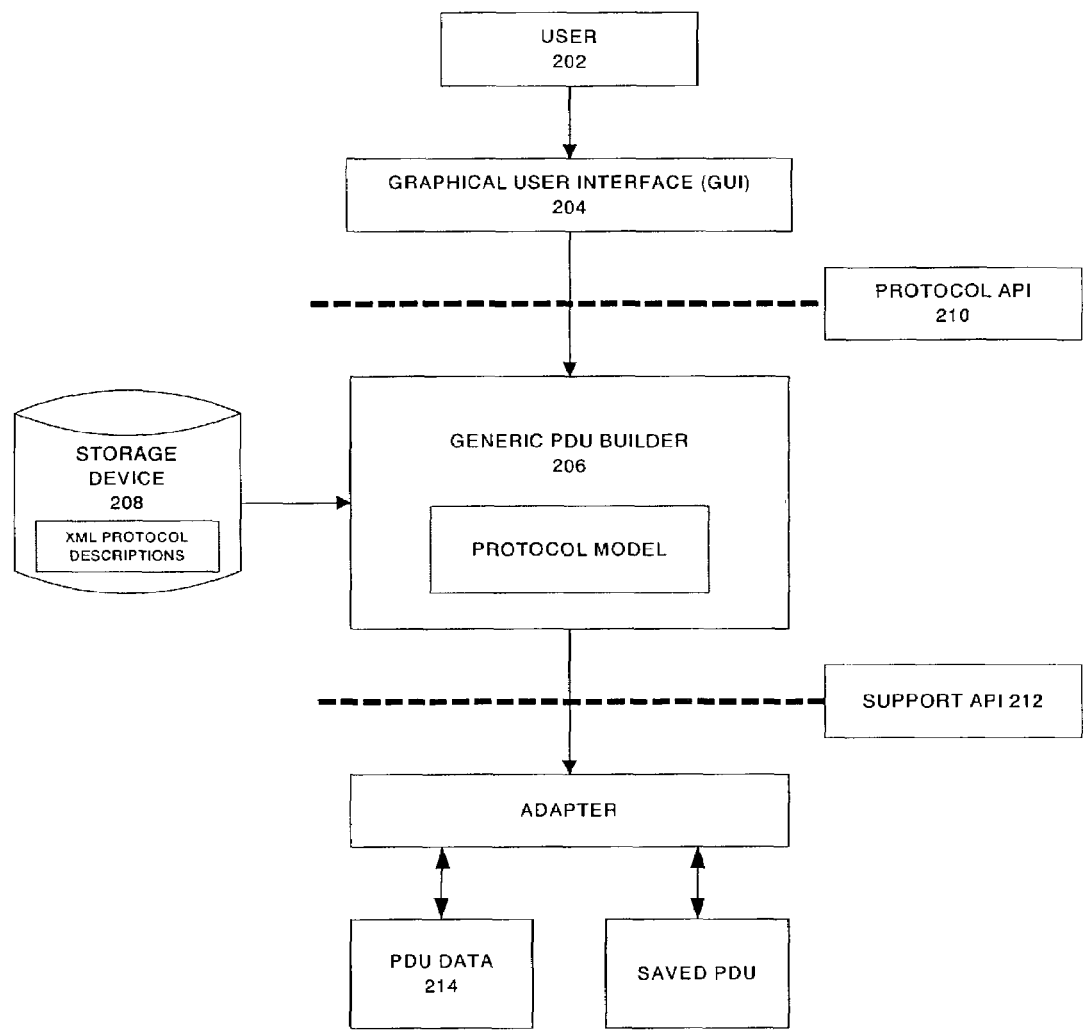
FIG. 2 illustrates the main components included in an embodiment of the invention.

Referring now to FIG. 2, a user 202 accesses the system to build a packet of test data in the form of a protocol data unit (PDU), via Graphical User Interface (GUI) 204, wherein the 'system' is shown as generic PDU builder 206. In this example, descriptions of existing protocols are stored on storage device 208. In the embodiment of FIG. 2, these descriptions are written using extensible mark-up language (XML). An example of the contents of an XML file that may be stored on storage device 208 and that describes the user datagram protocol (UDP) is included in the APPENDIX.

This description is then used by generic protocol builder 206 to build a default PDU characterized by the described attributes of UDP, and is therefore, useful for transmission using UDP. Generic protocol builder 206 presents a default PDU built in accordance with the described UDP attributes to user 202 via GUI 204. User 202 is then able to change the field selections and values of the default UDP packet to create a UDP packet that meets the user's requirements. As the default PDU is changed, the generic PDU builder updates any checksums or other fields that are dependent on the values changed. In cases where protocols are nested inside PDUs, one or more of the protocols used may refer to information from fields in a parent (or other) protocol to determine a local field value such as a checksum. In the sample code in the APPENDIX, UDP refers to the source_address field in the ipv4 protocol.

Protocol Application Program Interface (API) 210 facilitates interaction between GUI 204 and generic PDU Builder 206. The API provides facilities for:
(a) accessing existing protocol descriptions;
(b) creating new protocol descriptions;
(c) modifying protocol descriptions; and
(d) creating and modifying packets.

The present invention may also be used to describe a new protocol, such as a proprietary protocol that requires testing by user 202, or any other protocol for which new PDUs are required. This can be done by accessing an existing protocol description and editing it so that the rules are in accordance with the new protocol. The new protocol description may then be saved on storage device 208 for later use.

Support API 212 provides for possible different packet storage facilities provided by the test system or computing device on which generic PDU builder 206 operates.

Generic PDU builder 206 constructs a PDU in accordance with a protocol description. PDU data 214 may be in binary or hexadecimal format, or any other format that may be defined by and/or built into generic PDU builder 206. PDU data 214 may then be transmitted over a communications network for protocol/network testing or otherwise.

Figure 3:
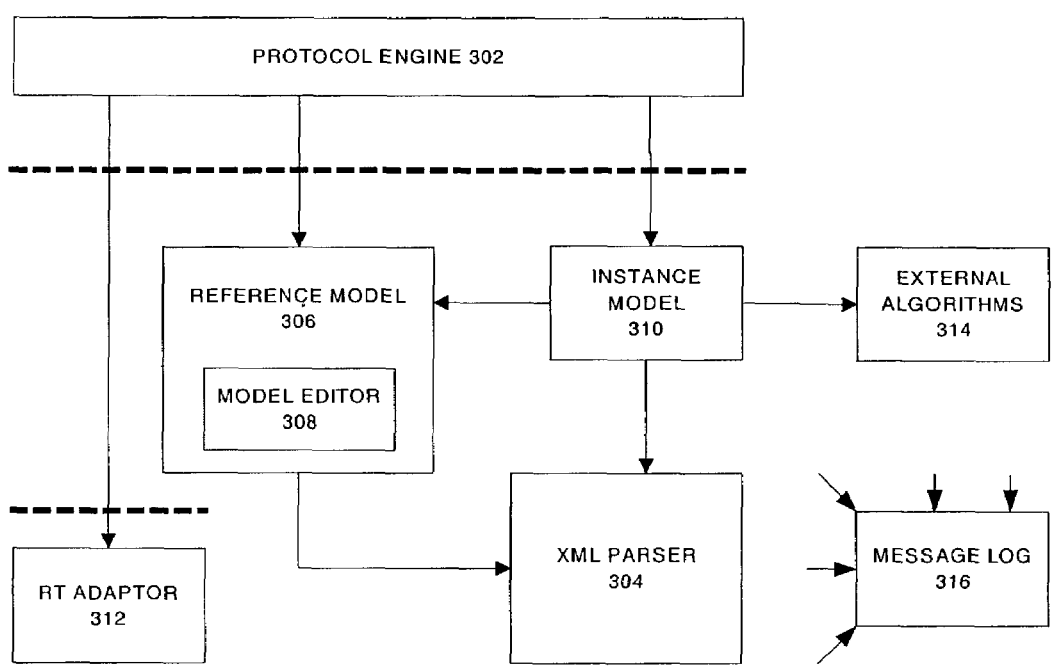
FIG. 3 illustrates components of an embodiment of the invention in more detail.

The functionality of generic PDU builder 206 may also be described using FIG. 3 wherein protocol engine 302 provides a discovery interface to a fully generic GUI such as GUI 204. Protocol engine 302 derives all protocol knowledge from external protocol descriptions, such as those stored in storage device 208 in FIG. 2. In operation, XML parser 304 scans a named directory for protocol descriptions, and builds an index table relating protocols to source files. Parser 304 also reads XML protocol descriptions into an internal data format, and writes XML from the same format when a new protocol description is being created.

Reference Model 306 stores all protocol description information that is provided by parser 304 in a read-only database. It also implements interfaces to other components of the system including protocol engine 302, model editor 308, instance model 310 and parser 304. Instance model 310 uses reference model 306 to construct and edit PDUs, or packets of test data. In the preferred embodiment of FIG. 3, instance model 310 uses a sophisticated resolve algorithm to ensure that all of the fields which are contained in the created PDU are consistent with the protocol description and with other fields if, for example, a particular field length calculation is affected by another field.

Often it is useful to test a network or protocol using varied field values, rather than sending exactly the same PDU or packet of data each time. Accordingly, instance model 310 contains data generators for generating ranges of values for use in streams of test packets. These value ranges may be incremented through a range of values, or pseudo-randomly generated from a pre-defined range. This may be done by allowing user 202 to specify field generator information using the GUI 204 and the generic PDU builder 206 of FIG. 2. Accordingly, the Generic PDU builder 206 may generate a PDU that resembles a PDU transmitted previously, or it may be configured to increment PDU field values after, say, the $50^{th}$ PDU has been transmitted. This may be useful for testing a protocol under a range of conditions. Instance model 310 also implements an interface to protocol engine 302.

Support adapter 312 acts as a PDU repository for storing saved PDUs. In a preferred embodiment, support adapter 312 has an adapter built in which saves to and/or restores PDU data from a specified file. However, a generalised support interface is provided for other repositories.

External algorithms 314 invoke routines for performing protocol-specific length and value functions, if they are required by the protocol description. Finally, message log 316 provides a user-level tracing mechanism which can be used to identify the source of error, should a PDU which is created be unresolvable.

Generic PDU builder 206 enables new solutions to be developed in network testing in a more expeditious manner than previous systems that have been used to build packets of test data, or PDUs. The present invention enables users to write a specific PDUs with values defined by the user, and to write new protocol descriptions by editing existing protocol descriptions. This empowers users, for the first time, to test their own proprietary protocols, without having to request appropriate PDUs and protocol-specific tasks that are hard-coded using a programming language from a third party. As a consequence, the present invention removes a hitherto ongoing burden from third parties who performed protocol-specific tasks and built instances of PDUs in the past.

Further, the generic approach of the present invention enables new protocols to be added, and new combinations of protocols to be tested, simply by adding a new protocol description to the system.

While the embodiments of the present invention have been illustrated in detail, it should be apparent that modifications and adaptations to these embodiments may occur to one skilled in the art without departing from the scope of the present invention as set forth in the following claims.

APPENDIX

```xml
<?xml version="1.0" standalone="yes" ?>
<ProtocolSet>
    <protocol name="udp" fullName="User Datagram Protocol"
        standard="RFC 768" lengthRef="message_length"
        lengthMultiplier="8" selectRef="ipv4:protocol" selectValue="17"
        sequence="udp_header udp_data">
        <field name="udp_header" fullName="UDP header"
            sequence="source_port dest_port message_length checksum" />
        <field name="source_port" fullName="Source port" length="16"
            format="integer" enumRef="port_numbers" />
        <field name="dest_port" fullName="Destination port" length="16"
            format="integer" enumRef="port_numbers" />
        <field name="message_length" fullName="Length"
            description="Length, in octets, of UDP datagram including
            header" minValue="8" maxValue="0xFF" length="16"
            format="integer" />
        <field name="checksum" fullName="Checksum" length="16"
            select="no_checksum computed_checksum"
            default="computed_checksum" />
        <field name="no_checksum" fullName="No checksum" length="16"
            defaultValue="0" format="hex" />
        <field name="computed_checksum" fullName="UDP checksum"
            length="16" format="hex" valueFunction="checksum"
            valueRef="udp_pseudo_header" />
        <field name="udp_pseudo_header" fullName="UDP Pseudo
            Header" instance="hidden" sequence="ipv4:source_address
            ipv4:dest_address zero_byte ipv4:protocol message_length
            source_port dest_port message_length zero_byte zero_byte
            udp_data" />
        <field name="zero_byte" fullName="zero" length="8" value="0" />
        <payload name="udp_data" />
    </protocol>
</ProtocolSet>
```

The invention claimed is:

1. A system for building a packet of test data for testing a communications network, the system comprising:
   (a) an interface for receiving at least one protocol description that provides one or more rules which are used to build the packet of test data;
   (b) a characterizing component which describes one or more protocols using said at least one protocol description;
   (c) a packet building component building the packet of test data in accordance with the one or more protocol descriptions, said packet building component comprising a protocol engine, said protocol engine interfacing with:
   a reference model for storing protocol description information, and
   an instance model for applying a range of values to said stored protocol description information for use in constructing said packet of test data; and
   (d) a storage component storing the packet of test data built by the packet building component.

2. A system for building a packet of test data according to claim 1 wherein a user specifies, via said interface, values, selections and other specifications which are desirable for building the packet of test data.

3. A system for building a packet of test data according to claim 1 further comprising:
   (a) a packet receiving component receiving one or more packets of data from the communications network; and
   (b) an interpreting component decoding the one or more received packets of data and describing characteristics of the one or more received packets of data.

4. A system for building a packet of test data according to claim 3 wherein the characteristics described by the packet interpreting component include at least one of:
   (a) fields defined in the one or more received packets;
   (b) values relating to fields in the one or more received packets; and
   (c) the protocol for which the one or more received packets were generated.

5. A system for building a packet of test data according to claim 1 wherein the packet of test data further includes at least one of a message and a nested packet.

6. A system for building a packet of test data according to claim 1 further composing an auxiliary component performing at least one of building checksums, determining a value for a field in the packet of test data wherein the field is defined as an attribute in the protocol description, and generating value ranges for a stream of packets of test data.

7. A system for building a packet of test data according to claim 1 further comprising a resolving component, ensuring that fields in the packet of test data are consistent with each other and consistent with the protocol description.

8. A system for building a packet of test data according to claim 1 wherein stored packets are re-usable.

9. The system of claim 1 wherein said instance model uses a resolve algorithm to ensure that all fields in said created test packet are consistent with said protocol description.

10. A method of building a packet of test data for testing a network device, the method comprising:
   (a) accessing, via a user interface, a protocol description, wherein the protocol description describes one or more rules for building the packet of test data;
   (b) supplying, via said user interface, one or more parameters that are specific to the packet of test data to be built; and
   (c) building, by a packet building component, the packet of test data in accordance with the protocol description and the supplied parameters; said packet building component comprising a protocol engine, said protocol engine interfacing with:

a reference model for storing protocol description information, and an instance model for applying a range of values to said stored protocol description information for use in constructing said packet of test data.

11. A method of building a packet of test data according to claim 10 wherein the parameters include at least one of values and selections, used to build said packet of test data.

12. A method of building a packet of test data according to claim 10 wherein the protocol description is retrieved from a storage device containing one or more descriptions of protocols.

13. A method of building a packet of test data according to claim 10 further comprising:
(a) receiving a packet of data from a communications network; and
(b) decoding the received packet to describe contents of the packet.

14. A computer program product residing on a programmable medium conveying a programmed method for building a packet of test data for testing a communications network, the programmed method comprising:
(a) receiving input defining a protocol description, wherein the protocol description describes one or more rules for building the packet of test data;
(b) accessing the protocol description;
(c) supplying parameters for building the packet of test data in accordance with the protocol description; and
(d) building, using a packet building component, the packet of test data using the supplied parameters, in accordance with the protocol description said packet building component comprising a protocol engine, said protocol engine interfacing with:
a reference model for storing protocol description information, and
an instance model for applying a range of values to said stored protocol description information for use in constructing said packet of test data.

15. A computer program product according to claim 14 wherein the parameters include at least one of values, selections and other specifications used to build a desirable packet of test data.

16. A computer program product according to claim 14 wherein the programmed method further comprises:
(a) receiving a packet of data from the computer network; and
(b) interpreting the received packet of data to describe the contents of the packet.

17. A computer program product according to claim 14 further comprising storing the packet of test data so that it is available for re-use.

18. A computer program product according to claim 14 wherein the protocol description is retrieved from a storage device containing one or more descriptions of protocols.

19. A system for building a packet of test data for testing a communications network, the system comprising:
a characterizing component which describes a plurality of different protocols using corresponding protocol descriptions, wherein the protocol descriptions each provide one or more rules for building the packet of test data for a corresponding one of the different protocols; and
a packet building component operable to build the packet of test data in accordance with the one or more rules of the corresponding protocol description of a selected one of the plurality of different protocols wherein said packet building component comprises a protocol engine, said protocol engine interfacing with:
a reference model for storing protocol description information; and
an instance model operable to use said stored protocol description information to construct said packet of test data and operable to interact with said reference model through an API.

20. The system of claim 19 further comprising:
a storage component operable to store the packet of test data built by the packet building component.

21. The system of claim 19 further comprising:
a user interface for receiving input defining said protocol descriptions.

22. The system of claim 19 further comprising:
a user interface for receiving input defining said one or more rules of a protocol description.

23. A method of building a packet of test data for testing a network device, the method comprising:
receiving, via an interface, input providing a protocol description for at least one protocol, wherein the protocol description includes one or more rules for building the packet of test data according to the protocol described;
building, via a protocol packet builder, the packet of test data in accordance with the one or more rules of the protocol description of a selected protocol, said packet building component comprising a protocol engine, said protocol engine interfacing with:
a reference model for storing protocol description information; and
an instance model operable to use said stored protocol description information to construct said packet of test data and operable to interact with said reference model through an API.

24. The method of claim 23 wherein said receiving comprises receiving the one or more rules.

25. The method of claim 23 wherein said receiving comprises receiving input for performing at least one of the following:
creating a new protocol description; and
modifying an existing protocol description.

26. A method of building a packet of test data for testing a network device, the method comprising:
selecting one of a plurality of different protocols according to which the packet of test data is to be built;
accessing, by a packet building component, a protocol description of the selected protocol, wherein the protocol description includes one or more rules for building the packet of test data; and
building, by the packet building component, the packet of test data for the selected protocol using the one or more rules, said packet building component comprising a protocol engine, said protocol engine interfacing with:
a reference model for storing protocol description information; and
an instance model operable to use said stored protocol description information to construct said packet of test data and operable to interact with said reference model through an API.

27. The method of claim 26 further comprising:
receiving, via an interface, input providing said protocol description for the selected protocol.

28. The method of claim 26 further comprising receiving input at said interface for performing at least one of the following:
accessing existing protocol descriptions;
creating new protocol descriptions; and
modifying protocol descriptions.

* * * * *